(12) United States Patent
Esaki et al.

(10) Patent No.: US 8,789,275 B2
(45) Date of Patent: Jul. 29, 2014

(54) WIND TURBINE BLADE AND METHOD OF MANUFACTURING WIND TURBINE BLADE

(75) Inventors: Kouji Esaki, Nagasaki (JP); Takao Kuroiwa, Nagasaki (JP); Nozomu Kawasetsu, Nagasaki (JP); Kentaro Shindo, Nagasaki (JP); Toru Matsuo, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/670,848

(22) PCT Filed: Jul. 9, 2009

(86) PCT No.: PCT/JP2009/062850
§ 371 (c)(1),
(2), (4) Date: Jun. 10, 2010

(87) PCT Pub. No.: WO2011/004504
PCT Pub. Date: Jan. 13, 2011

(65) Prior Publication Data
US 2012/0093656 A1    Apr. 19, 2012

(51) Int. Cl.
*B21D 53/78* (2006.01)
(52) U.S. Cl.
USPC .................... 29/889.71; 29/889.7; 29/889.72
(58) Field of Classification Search
USPC .......... 29/889, 889.2, 889.21, 889.7, 889.71, 29/889.72, 897, 897.2; 416/229 R
See application file for complete search history.

(56) References Cited

U.S. PATENT DOCUMENTS

| 2007/0183888 | A1 | 8/2007 | Gunneskov et al. |
| 2007/0251090 | A1* | 11/2007 | Breugel et al. ............... 29/889.7 |
| 2009/0169392 | A1 | 7/2009 | Kuroiwa et al. |
| 2011/0116935 | A1 | 5/2011 | Wansink |
| 2011/0142679 | A1 | 6/2011 | Bendel et al. |

FOREIGN PATENT DOCUMENTS

| JP | 2000179448 A | 6/2000 |
| JP | 2001165033 A | 6/2001 |
| JP | 2002357176 A | 12/2002 |

(Continued)

OTHER PUBLICATIONS

ISR for PCT/JP2009/062850 dated Sep. 8, 2009.

(Continued)

*Primary Examiner* — David Bryant
*Assistant Examiner* — Ryan J Walters
(74) *Attorney, Agent, or Firm* — Kanesaka Berner & Partners, LLP

(57) ABSTRACT

A wind turbine blade having a spar cap disposed between layers constituting an outer skin or disposed on an inner side of the outer skin and a method of manufacturing the wind turbine blade are provided, wherein in manufacture of the wind turbine blade, generation of manufacturing defects, such as misalignment and wrinkles in fabrics, can be suppressed and the time required for repairing the defects as well as for laminating the layers can be reduced. In the method of manufacturing the wind turbine blade having the spar cap as a main structural member of the blade disposed between the layers constituting the outer skin or disposed on the inner side of the outer skin, the spar cap is formed as a separate piece from the outer skin, and the spar cap, dry fiber fabrics for the layers constituting the outer skin, and a sandwich core member are collectively impregnated with resin under a vacuum process.

1 Claim, 5 Drawing Sheets

(56) References Cited

FOREIGN PATENT DOCUMENTS

| JP | 2004009604 | A | 1/2004 |
| JP | 2007255366 | A | 10/2007 |
| WO | 2009139619 | A1 | 11/2009 |
| WO | 2009156061 | A2 | 12/2009 |

OTHER PUBLICATIONS

International Preliminary Report on Patentability corresponding to PCT/JP2009/062850, dated Feb. 14, 2012.
Extended European Search Report dated Apr. 18, 2013 corresponds to European Application No. 09801367.5.

* cited by examiner

Prior art

WIND TURBINE BLADE AND METHOD OF MANUFACTURING WIND TURBINE BLADE

RELATED APPLICATIONS

The present application is based on, and claims priority from, International Application Number PCT/JP2009/062850, filed Jul. 9, 2009, the disclosure of which is hereby incorporated by reference herein in its entirety.

TECHNICAL FIELD

The present invention relates to a wind turbine blade having a spar cap as a main structural member of the blade disposed between layers constituting an outer skin or disposed on an inner side of the outer skin, and a method of manufacturing the wind turbine blade.

BACKGROUND ART

Recently, as a wind turbine blade satisfying requirements for both lightweight and high strength, a wind turbine blade having a spar cap structure has been used, wherein a main structural member called the spar cap is disposed in a limited portion of the outer skin located around the area where the blade has a maximum thickness in cross section.

FIG. 6(A) is a cross sectional view of a wind turbine blade having such a spar cap structure. Referring to FIG. 6(A), a blade 100 includes an outer skin layer 1 which entirely covers a suction side and a pressure side of the blade, spar caps 2 and 2 arranged on the suction side and the pressure side, respectively, and lightweight core members 3 and 4 inserted into the outer skin layer 1 at four positions.

Shear webs 7, 7 for linking the spar cap 2 on the suction side and the spar cap 2 on the pressure side have their respective ends bonded to the inner sides of the spar caps 2 and 2.

To manufacture the blade 100 described above, as shown in FIG. 6(B), dry fiber fabrics 1s for forming the outer skin layer 1, sandwich core members 3a and 4a, and dry fiber fabrics 1a for forming the spar cap are laminated on one another on a mold 10, and are impregnated with resin under a vacuum process.

Then, on the inner sides of the spar caps 2 and 2 arranged on the suction side and the pressure side, the respective ends of the shear webs 7, 7 for linking the spar caps 2 and 2 are secured by bonding. The suction side and the pressure side of the blade are then bonded to each other at a leading edge 5 and a trailing edge 6 of the blade, and lastly, the outer periphery of the outer skin layer 1 is finished.

An example of a wind turbine blade having the above-described structure is disclosed in Patent Document 1 (Japanese Patent Application Laid-Open No. 2007-255366).

In manufacture of the wind turbine blade 100 as shown in FIGS. 6(A) and 6(B), however, the outer skin layer 1 and the spar cap 2 are laminated on the same mold in turn. The laminating processes cannot be performed in parallel.

The laminating processes are performed using a plurality of sheets of dry fiber fabrics each having a length of several tens of meters, taking a considerable amount of time.

Further, the long sheets for the outer skin layer 1 and the spar cap 2 are laminated on a curved inner surface of the mold, during which the non-adhesive sheets of dry fiber fabrics are laid over one another. As a result, misalignment and other defects would highly likely occur, leading to variation in precision of the products. Repairing such defects also requires a considerable amount of time.

Furthermore, in manufacture of the blade 100, the dry fiber fabrics 1s for the outer skin layer 1, the sandwich core members 3a and 4a, and the dry fiber fabrics 1a for the spar cap 2, which have been laminated on one another on the mold 10, are impregnated with resin under a vacuum process. Therefore, slacks generated in the fabrics during the laminating processes would likely cause manufacturing defects such as wrinkles in the fabrics upon completion of the resin impregnation.

Still further, in the case where the manufacturing defects, such as the wrinkles in the fabrics, are found at the inspection stage, repairing the defects will also require a considerable amount of time as well as a large number of man-hours.

PRIOR ART DOCUMENTS

Patent Documents

[Patent Document 1] Japanese Patent Application Laid-Open No. 2007-255366

SUMMARY OF THE INVENTION

In view of the above-described problems of the related art, an object of the present invention is to provide a wind turbine blade having a spar cap disposed between layers constituting an outer skin or disposed on an inner side of the outer skin and a method of manufacturing the wind turbine blade, wherein in manufacture of the wind turbine blade, generation of manufacturing defects such as misalignment and wrinkles in fabrics can be suppressed and the time required for repairing such defects as well as the time required for laminating the layers can be reduced.

To achieve the above object, the present invention provides a method of manufacturing a wind turbine blade having a spar cap disposed between layers constituting an outer skin or disposed on an inner side of the outer skin, the spar cap serving as a main structural member of the blade, wherein the spar cap is formed as a separate piece from the blade, and the spar cap, dry fiber fabrics for the layers constituting the outer skin, and a sandwich core member are arranged on a mold together, and then impregnated with resin under a vacuum process.

The above-described manufacture of the wind turbine blade, in which the spar cap is formed as a separate piece from the blade prior to the resin impregnation process, may be configured as follows:

(1) The spar cap is divided into a plurality of spar caps in a blade width direction and formed as separate pieces, and those spar caps, the dry fiber fabrics for the layers constituting the outer skin, and the sandwich core member are arranged on the mold together, and then impregnated with resin under the vacuum process.

(2) Mesh type flow media are inserted between and beneath the plurality of spar caps, and the spar caps with the flow media, the dry fiber fabrics for the layers constituting the outer skin, and the sandwich core member are arranged on the mold together, and then impregnated with resin under the vacuum process.

(3) A wind turbine blade has a spar cap as a main structural member of the blade disposed on an inner side of an outer skin, wherein the spar cap is formed as a separate piece from the outer skin, and is secured to an inner side of the outer skin by an adhesive so that the spar cap and the outer skin are joined together.

Alternatively, the wind turbine blade may be configured as follows:

A wind turbine blade has a spar cap as a main structural member of the blade disposed on an inner side of an outer skin, wherein the spar cap is formed as a separate piece from the outer skin, the spar cap includes a spar cap provided on a suction side of the blade and a spar cap provided on a pressure side of the blade, a shear web for linking the spar cap on the suction side and the spar cap on the pressure side has respective ends secured to inner sides of the spar caps by an adhesive, and the spar caps each have an outer side secured to an inner side of the outer skin by an adhesive.

According to the present invention, the spar cap is formed as a separate piece from the blade, and the spar cap, the dry fiber fabrics for the layers constituting the outer skin, and the sandwich core member are collectively impregnated with resin under a vacuum process.

Specifically, the spar cap is formed as a separate piece from the blade, by vacuum impregnation or preimpregnation using unsaturated polyester resin, vinyl ester resin, epoxy resin, or the like. Then, the separately formed spar cap, the dry fiber fabrics such as glass fiber fabrics, carbon fiber fabrics, or the like for the layers constituting the outer skin, and the sandwich core member are collectively impregnated with resin under the vacuum process.

As a result, the production line for the outer skin layer and the production line for the spar cap are independent from each other, and in the case of continuously manufacturing a plurality of wind turbine blades, the outer skin layers and the spar caps are manufactured in parallel process steps, leading to a reduced cycle time for the manufacture of the wind turbine blades.

Further, the spar cap which has been formed as a separate piece from the blade, the dry fiber fabrics for the outer skin layer, and the sandwich core member are altogether impregnated with resin under the vacuum process. Thus, as compared with the method of the related art where the long sheets for the outer skin layer and for the spar cap are laminated on the same mold in turn, generation of manufacturing defects, such as misalignment and wrinkles in the fabrics, can be suppressed.

Furthermore, the time required for repairing the defects can be cut short, i.e., the time for repairing the defects and for laminating the layers can be reduced, whereby the cycle time for the manufacture of the wind turbine blades can be shortened.

Still further, inspection of finishing of the spar caps is facilitated, which results in improved stability of the products. Moreover, the production lines for the outer skin layers and for the spar caps are separated from each other, which simplifies the laminating processes. This allows the production lines to be automated more easily.

The spar cap may be divided into a plurality of spar caps in the blade width direction and formed as separate pieces, and the spar caps, the dry fiber fabrics for the layers constituting the outer skin, and the sandwich core member may be arranged on the mold together and then impregnated with resin under the vacuum process. Further, mesh type flow media may be inserted between and beneath the plurality of spar caps, and the spar caps with the flow media, the dry fiber fabrics for the layers constituting the outer skin, and the sandwich core member may be arranged on the mold together and then impregnated with resin under the vacuum process. In these cases, the heavy spar cap can be formed as a plurality of spar caps separately, which simplifies handling thereof. Moreover, in resin impregnation, the gap between the neighboring spar caps becomes a path through which the resin flows, ensuring that the resin reaches the portion of the outer skin layer facing the spar cap. This reduces the possibility that insufficient impregnation of resin occurs locally, leading to improved quality stability.

Furthermore, when the mesh type flow media or thick glass fiber fabrics are inserted between and beneath the plurality of spar caps, the flow of the resin during impregnation becomes uniform, ensuring more improved quality stability.

The wind turbine blade may be a wind turbine blade having a spar cap as a main structural member of the blade disposed on an inner side of an outer skin, wherein the spar cap is formed as a separate piece from the outer skin and is secured to an inner side of the outer skin by an adhesive so that the spar cap and the outer skin are joined together. In this case, the spar cap, which has been formed as a separate piece, is secured to the outer skin layer, which has already been formed, by an adhesive.

This allows the spar cap to be attached through a simple operation of bonding.

Further, the outer skin layer is formed independently in advance, which prevents the undesirable event that the pre-fabricated spar cap interrupts the flow of the resin that may occur when the pre-fabricated spar cap is disposed between the layers constituting the outer skin or disposed on an inner side of the outer skin prior to the resin impregnation process. Accordingly, the outer skin layer is unlikely to suffer local insufficient impregnation of resin, so that quality stability is ensured.

Furthermore, the wind turbine blade may be a wind turbine blade having a spar cap as a main structural member of the blade disposed on an inner side of an outer skin, wherein the spar cap is formed as a separate piece from the outer skin, the spar cap includes a spar cap provided on a suction side of the blade and a spar cap provided on a pressure side of the blade, a shear web for linking the spar cap on the suction side and the spar cap on the pressure side has respective ends secured to inner sides of the spar caps by an adhesive, and the spar caps each have an outer side secured to an inner side of the outer skin by an adhesive. In this case, the respective ends of the shear web are bonded to the spar caps which have been formed separately, and thereafter, the outer side of each spar cap is bonded to the inner side of the outer skin. This makes it easy to find any unbonded portion during the process of bonding the shear web to the spar caps, thereby facilitating repairing of such unbonded portions.

MODES FOR CARRYING OUT THE INVENTION

Hereinafter, embodiments of the present invention will be described in detail with reference to the drawings.

It should be noted that the dimensions, materials, shapes, and relative arrangements of the components described in the embodiments are only illustrative, which are not intended to restrict the scope of the invention, unless otherwise stated.

First Embodiment

Figure 1:
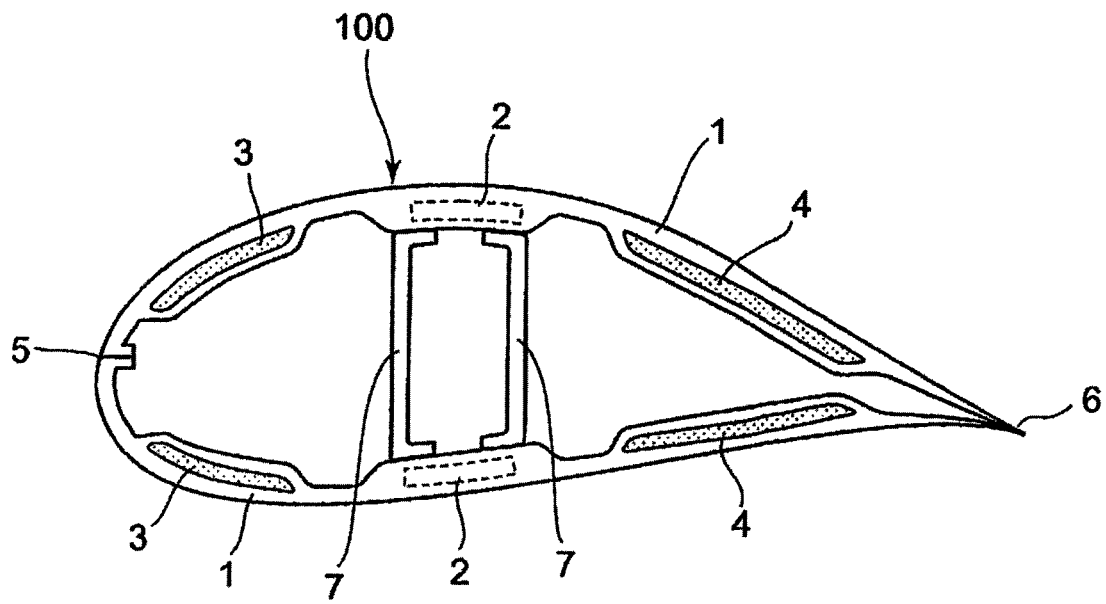
FIG. 1 is a cross sectional view of a wind turbine blade according to a first embodiment of the present invention.

FIG. 1 is a cross sectional view of a wind turbine blade according to a first embodiment of the present invention.

Figure 2:
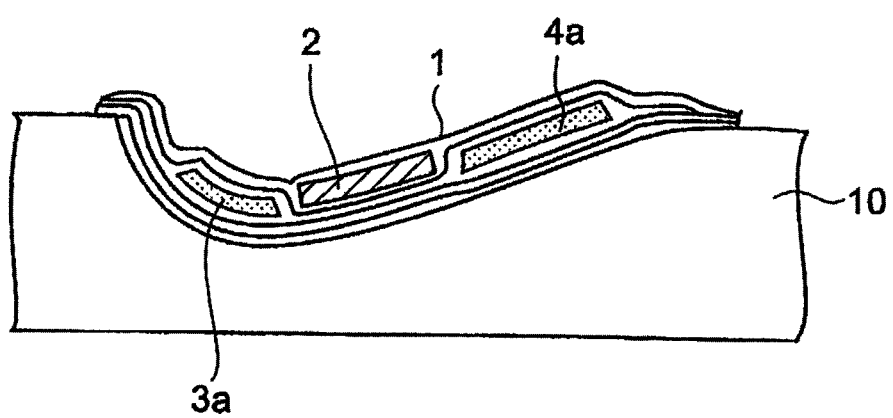
FIG. 2 is a cross sectional view of a main part illustrating the state where a separately formed spar cap, dry fiber fabrics for layers constituting an outer skin, and sandwich core members, which have been arranged on a mold together, are impregnated with resin under a vacuum process.

FIG. 2 is a cross sectional view of a main part illustrating the state where a separately formed spar cap, dry fiber fabrics for layers constituting an outer skin, and sandwich core members, which have been arranged on a mold together, are impregnated with resin under a vacuum process.

Referring to FIGS. 1 and 2, a blade 100 has an outer skin layer 1 which entirely covers a suction side and a pressure side of the blade, spar caps 2 and 2 on the suction side and the pressure side, respectively, which are formed in a manner as will be described below, and lightweight sandwich core members 3 and 4 which are inserted into the outer skin layer 1 at four positions.

Shear webs 7, 7 for linking the spar cap 2 on the suction side and the spar cap 2 on the pressure side have their respective ends fixedly secured to the inner sides of the spar caps 2 and 2.

With the ends of the shear webs 7, 7 fixedly secured, the suction side and the pressure side of the blade are bonded together at a leading edge 5 and a trailing edge 6, and lastly, an outer periphery of the outer skin layer 1 is finished.

Referring to FIG. 2, the spar cap 2 is formed, as a separate piece from the blade 100, by vacuum impregnation or preimpregnation using unsaturated polyester resin, vinyl ester resin, epoxy resin, or the like.

Then, the spar cap 2 formed as a separate piece, the dry fiber fabrics such as glass fiber fabrics, carbon fiber fabrics, or the like for the outer skin layer 1, and the sandwich core members 3a and 4a are arranged on a mold 10, which are then impregnated with resin under a vacuum process.

Therefore, according to the present embodiment, the production line for the outer skin layer 1 and the production line for the spar cap 2 are independent from each other, and in the case of continuously manufacturing a plurality of wind turbine blades, the outer skin layers and the spar caps are manufactured in parallel process steps, leading to a reduced cycle time for the manufacture of the wind turbine blades.

Further, the spar cap 2 which has been formed as a separate piece from the blade 100, the dry fiber fabrics for the outer skin layer 1, and the sandwich core members 3a and 4a are altogether impregnated with resin under the vacuum process. Thus, as compared with the method of the related art where the long sheets for the outer skin layer 1 and for the spar cap 2 are laminated on the same mold in turn, generation of manufacturing defects, such as misalignment and wrinkles in the fabrics, can be suppressed.

Furthermore, the time required for repairing the defects can be cut short, i.e., the time for repairing the defects and for laminating the layers can be reduced, whereby the cycle time for the manufacture of the wind turbine blades can be shortened.

Still further, inspection of finishing of the spar caps 2 is facilitated, which results in improved stability of the products.

Moreover, the production lines for the outer skin layers 1 and for the spar caps 2 are separated from each other, which simplifies the laminating processes. This allows the production lines to be automated more easily.

Second Embodiment

Figure 3A:
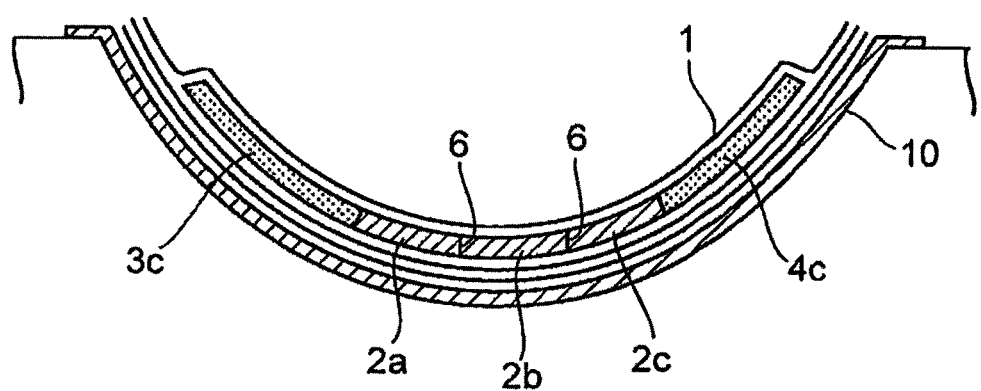
FIG. 3(A) is a cross sectional view of a main part of a wind turbine blade, which is under a vacuum process, according to a second embodiment of the present invention.
Figure 3B:
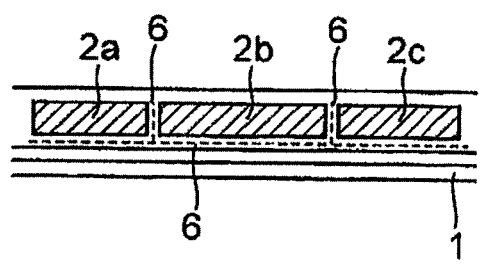
FIG. 3(B) is an enlarged view of the spar cap portion.

FIG. 3(A) is a cross sectional view of a main part of a wind turbine blade, which is under a vacuum process, according to a second embodiment of the present invention, and FIG. 3(B) is an enlarged view of the spar cap portion.

In the second embodiment, the spar cap is divided into a plurality of (in this example, three) spar caps in the blade width direction and formed as separate pieces as in the first embodiment, and these spar caps 2a, 2b, and 2c, the dry fiber fabrics for the outer skin layer 1, and the sandwich core members 3c and 4c are arranged on a mold together, which are then impregnated with resin under a vacuum process.

During the process of laminating the spar caps 2a, 2b, and 2c, the dry fiber fabrics for the outer skin layer 1, and the sandwich core members 3c and 4c, mesh type flow media 6 are inserted between and beneath the plurality of (in this example, three) spar caps 2a, 2b, and 2c.

For the flow media 6, fishing net, or thick and coarse glass fiber fabrics may be used.

According to the second embodiment, the relatively heavy spar cap 2 is divided into a plurality of spar caps 2a, 2b, and 2c and formed separately, which simplifies handling thereof. Moreover, in resin impregnation, the gap between the neighboring spar caps becomes a path through which the resin flows, ensuring that the resin reaches the portion of the outer skin layer facing the spar cap. This reduces the possibility that insufficient impregnation of resin occurs locally, leading to improved quality stability.

Furthermore, when the mesh type flow media 6 such as thick glass fiber fabrics and the like are inserted between and beneath the plurality of spar caps 2a, 2b, and 2c, the flow of the resin during impregnation becomes uniform, ensuring more improved quality stability.

Otherwise, the configuration of the second embodiment is identical to that of the first embodiment.

Third Embodiment

Figure 4A:
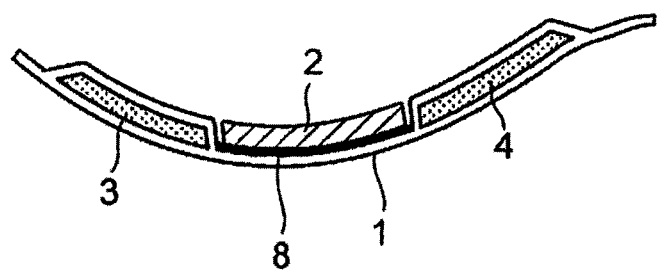
FIG. 4(A) is a cross sectional view of a main part of a wind turbine blade according to a third embodiment of the present invention.
Figure 4B:
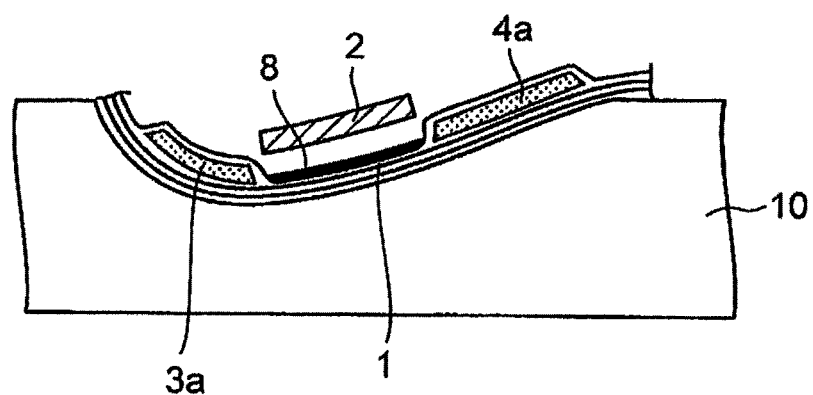
FIG. 4(B) is a cross sectional view of a main part illustrating the state where a separately formed spar cap is about to be bonded to a predetermined position on an outer skin layer which has been formed independently on a mold.

FIG. 4(A) is a cross sectional view of a main part of a wind turbine blade according to a third embodiment of the present invention, and FIG. 4(B) is a cross sectional view of a main part illustrating the state where a separately formed spar cap is about to be bonded to a predetermined position on an outer skin layer which has been formed independently on a mold.

In the third embodiment, the spar cap 2 is formed as a separate piece from the blade 100, as in the first embodiment, and the spar cap 2 is secured to the inner side of the outer skin layer 1 by an adhesive 8, so that the spar cap 2 and the outer skin layer 1 are joined together.

This allows the spar cap 2 to be attached through a simple operation of bonding. Further, the outer skin layer 1 is formed independently in advance, which prevents the undesirable event that the pre-fabricated spar cap 2 interrupts the flow of the resin that may occur when the pre-fabricated spar cap 2 is disposed between the layers constituting the outer skin 1 or disposed on an inner side of the outer skin 1 prior to the resin impregnation process. Accordingly, the outer skin layer 1 is unlikely to suffer local insufficient impregnation of resin, so that quality stability is ensured.

Otherwise, the configuration of the third embodiment is identical to that of the first embodiment.

Fourth Embodiment

Figure 5:
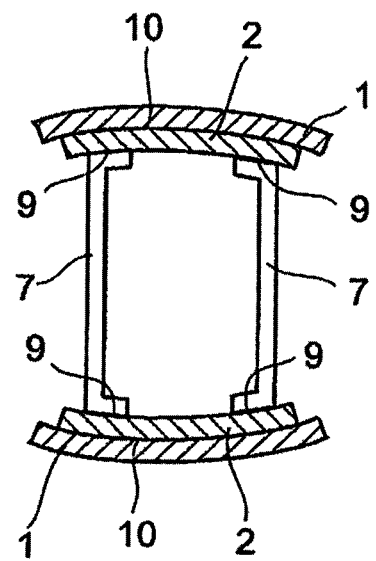
FIG. 5 is a partial cross sectional view of a portion where shear webs are attached, according to a fourth embodiment of the present invention.
Figure 6A:
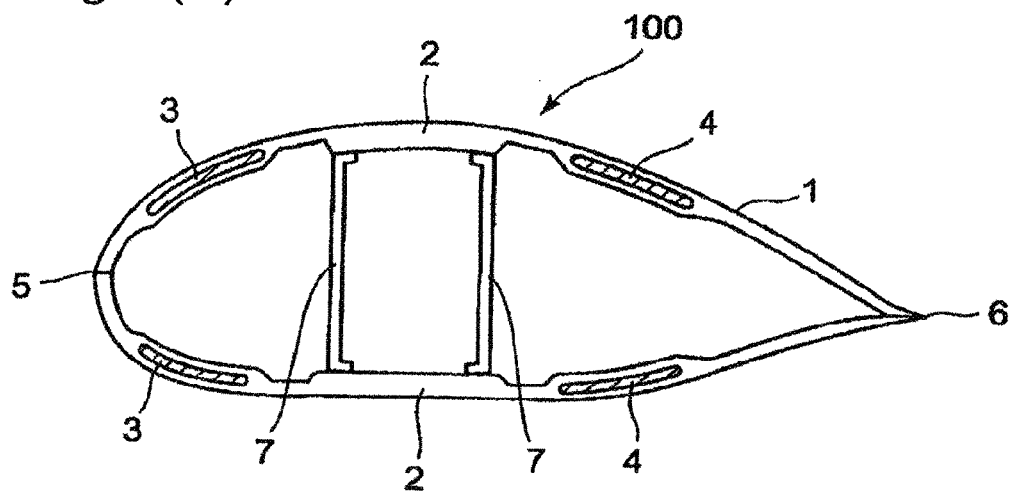
FIG. 6(A) is a cross sectional view of a wind turbine blade having the spar cap structure.
Figure 6B:
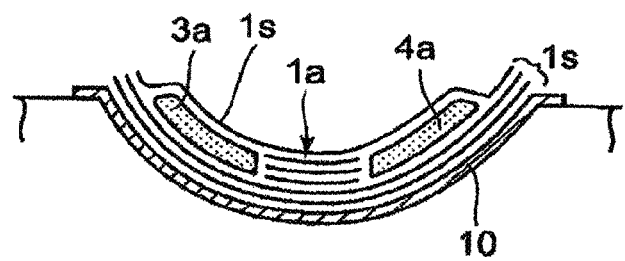
FIG. 6(B) is a cross sectional view of a main part of the wind turbine blade in a vacuum impregnation process.

FIG. 5 is a partial cross sectional view of a portion where shear webs are attached, according to a fourth embodiment of the present invention.

In the fourth embodiment, each spar cap 2 is formed as a separate piece from the blade 100, and the shear webs 7, 7 for linking the spar caps 2 and 2 have their respective ends secured to the inner sides of the spar caps 2 and 2 by an adhesive 9, and subsequently, the outer side of each spar cap 2, 2 is secured to the outer skin layer 1, 1 by an adhesive 10.

According to the fourth embodiment, the respective ends of each shear web 7, 7 are secured by the adhesive 9 to the spar caps 2, 2 which have been formed as separate pieces from the blade 100, and thereafter, the outer side of each spar cap 2, 2 is secured by the adhesive 10 to the outer skin layer 1, 1. This makes it easy to find any unbonded portion during the process of bonding the shear webs 7, 7 to the spar caps 2, 2, thereby facilitating repairing of such unbonded portions.

Otherwise, the configuration of the fourth embodiment is identical to that of the first embodiment.

INDUSTRIAL APPLICABILITY

According to the present invention, it is possible to provide a wind turbine blade having a spar cap disposed between layers constituting an outer skin or disposed on an inner side of the outer skin, and a method of manufacturing the wind turbine blade, wherein in manufacture of the wind turbine blade, generation of manufacturing defects such as misalignment and wrinkles in fabrics can be suppressed and the time required for repairing such defects as well as for laminating the layers can be reduced.

The invention claimed is:

1. A method of manufacturing a wind turbine blade having a spar cap disposed between layers constituting an outer skin or disposed on an inner side of the outer skin, the spar cap serving as a main structural member of the blade, the method comprising:
    forming the spar cap composed of a fiber-reinforced plastic, the spar cap divided into a plurality of spar caps in a blade width direction and formed as separate pieces so that a gap is formed between two neighboring spar caps in the plurality of spar caps;
    inserting mesh type flow media beneath the plurality of spar caps and in the gap between said two neighboring spar caps in the plurality of spar caps;
    arranging the plurality of spar caps with the flow media, dry fiber fabrics for layers constituting the outer skin, and a sandwich core member on a mold together; and
    impregnating with resin the dry fiber fabrics arranged on the mold together with the plurality of spar caps and the sandwich core member, under a vacuum process.

* * * * *